United States Patent Office 3,598,719
Patented Aug. 10, 1971

3,598,719
HYDROTREATING CATALYST AND PROCESS
Robert J. White, Pinole, Calif., assignor to Chevron
Research Company, San Francisco, Calif.
Filed Aug. 5, 1969, Ser. No. 847,540
Int. Cl. C10g 13/02
U.S. Cl. 208—59                               9 Claims

ABSTRACT OF THE DISCLOSURE

A catalyst comprising a crystalline zeolitic molecular sieve component substantially free of any catalytic metal or metals, an alumina-containing gel component, a Group VI hydrogenating component and Group VIII hydrogenating component, and processes using said catalyst.

Introduction

This invention relates to catalytic hydrocarbon conversion, including catalytic hydrodenitrification and catalytic hydrocracking.

Prior art

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pat. 3,140,251; U.S. Pat. 3,140,253; British Pat. 1,056,301; French Pat. 1,503,063; and French Pat. 1,506,-793.

There has been a continuing search for further improvements in such catalysts, particularly for hydrocracking and hydrofining uses. It is known that the results of catalyst modifications often are largely unpredictable, and the increased number of possible modifications in catalysts containing an additional molecular sieve component does not diminish the unpredictability. A significantly improved result in a test with a modified catalyst containing a molecular sieve component and other catalyst components seldom would have been predictable before the test, particularly in hydrocracking and hydrofining applications of such catalysts, and is a much-desired goal.

Objects

In view of the foregoing, objects of the present invention include providing an improved catalyst comprising a crystalline zeolitic molecular sieve component associated with other catalyst components that has, compared with similar prior art catalysts:

(1) high hydrocracking activity,
(2) high hydrodenitrification activity, and
(3) high stability, i.e., low fouling rate, particularly in hydrodenitrification service.

Further objects of the present invention include provisions of hydrocracking and hydrofining processes, and combinations thereof, using said improved catalyst, that thereof, in an amount of 5 to 30 weight percent, preferjet fuel and other valuable fuel products.

The present invention will best be understood, and further objects and advantages thereof will be apparent, from the following description when read in connection with the accompanying drawing.

Drawing

Figure 1:
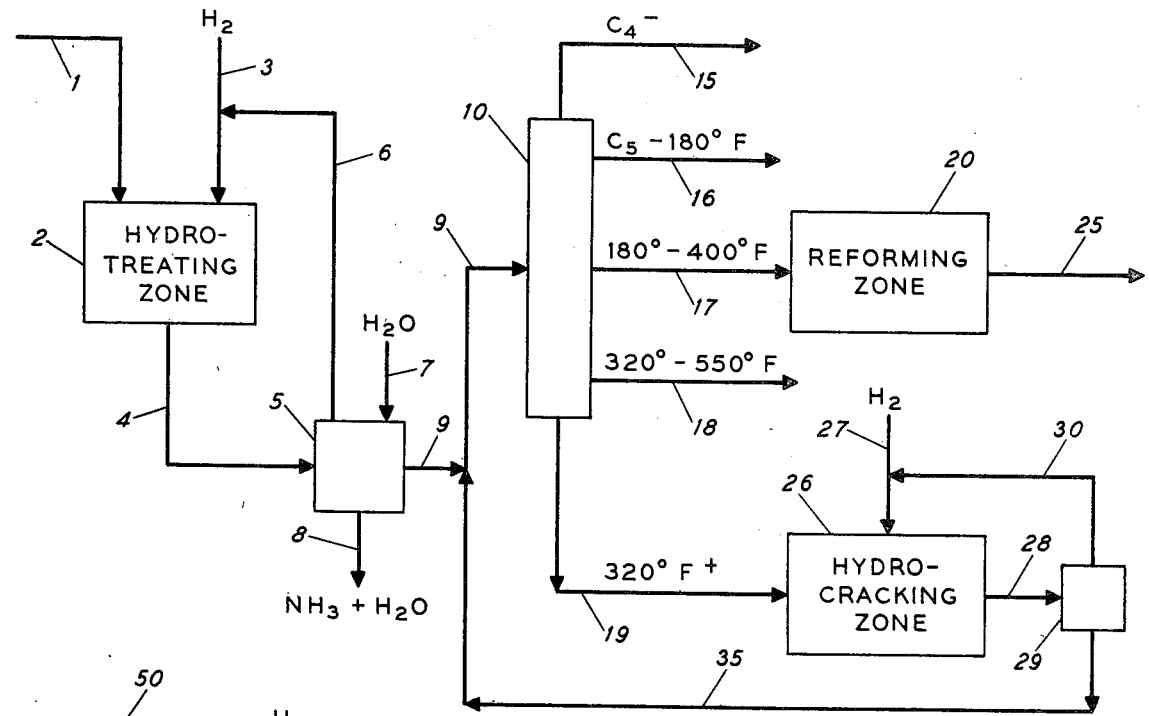

In the drawing, FIG. 1 is a diagrammatic illustration of apparatus and flow paths suitable for carrying out the process of several of the embodiments of the present invention, wherein the catalyst of the present invention is used on a once-through basis to concurrently hydrocrack and hydrodenitrify a hydrocarbon feedstock to produce more valuable products, some of which may be further upgraded by catalytic reforming or catalytic hydrocracking, if desired.

Figure 2:
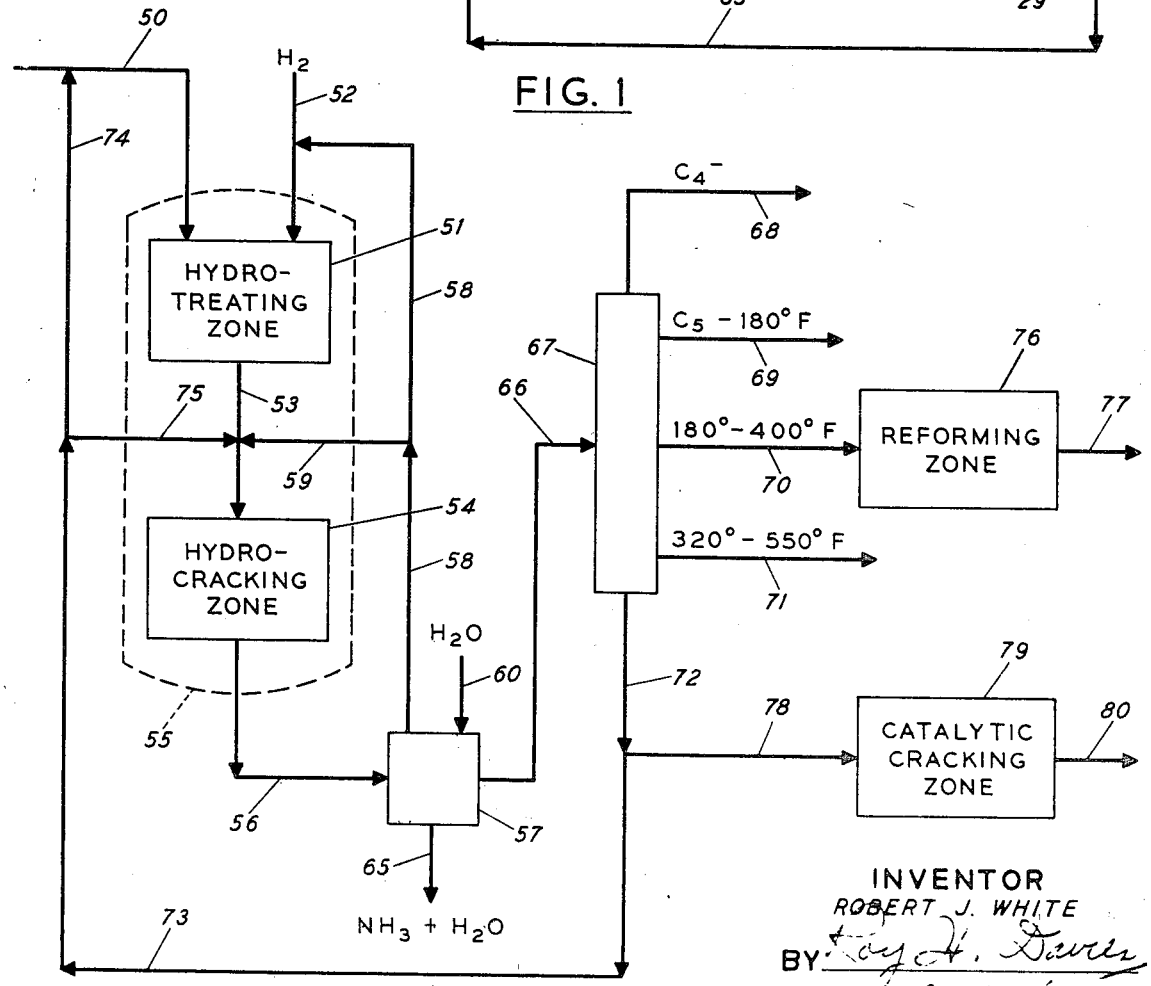

FIG. 2 is a diagrammatic illustration of apparatus and flow paths suitable for carrying out the process of additional embodiments of the present invention, wherein the catalyst of the present invevntion is used to concurrently hydrofine and hydrocrack a hydrocarbon feedstock, wherein the hydrofining-hydrocracking zone may be operated on a recycle basis, and wherein certain portions of the effluent from the hydrofining-hydrocracking zone may be catalytically reformed or catalytically cracked, as desired.

Statement of invention

In accordance with the present invention, it has been found that the foregoing objects are achieved by a catalyst containing a unique combination of catalytic components in particular amounts, including alumina, a Group VI component, a Group VIII component, and a crystalline zeolitic molecular sieve component that is substantially in the ammonia or hydrogen form and that is substantially free of any catalytic loading metal or metals.

More particularly, in accordance with the present invention there is provided a catalyst composite comprising:

(A) A gel matrix comprising:
 (a) less than 15 weight percent silica,
 (b) alumina, in an amount providing an alumina-to-silica weight ratio of 50/50 to 100/0, preferably 70/30 to 100/0,
 (c) nickel or cobalt, or the combination thereof, in the form of metal, oxide, sulfide or any combination thereof, in an amount of 1 to 10 weight percent, preferably 5 to 9 weight percent, of said matrix, calculated as metal,
 (d) molybdenum or tungsten, or the combination thereof, in the form of metal oxide, sulfide or any combination thereof, an an amount of 5 to 30 weight percent, preferably 10 to 25 weight percent, of said matrix, calculated as metal;

(B) A crystalline zeolitic molecular sieve:
 (a) substantially in the ammonia or hydrogen form,
 (b) substantially free of any catalytic loading metal or metals,
 (c) in particulate form,
 (d) dispersed through said matrix,
 (e) in an amount of 30 to 70 weight percent of said composite; said catalyst composite being further characterized by an average pore diameter below 100 angstroms and a surface area above 200 square meters per gram.

Preferably said gel matrix comprises nickel and molybdenum, in the form of the metals, oxides, sulfides or any combination thereof. Said molecular sieve is present in an amount of 30 to 70 weight percent, preferably 40 to 70 weight percent, and more preferably above 50 and below 70 weight percent, of said composite.

The catalyst composite of the present invention is characterized by a bulk density in the range 0.35 to 0.7 grams per cubic centimeter.

Still further in accordance with the present invention, there is provided a hydrotreating process which comprises contacting a hydrocarbon feed containing substantial amounts of materials boiling above 200° F. and selected from the group consisting of petroleum distillates, solvent-deasphalted petroluem residua, shale oils and coal tar distillates, in a reaction zone with hydrogen and the catalyst described above, at hydrotreating conditions including a temperature in the range 400° to 950° F, a pressure in the range 800 to 3500 p.s.i.g., a liquid hourly space velocity in the range 0.1 to 5.0 and a total hydrogen supply rate of 200 to 20,000 s.c.f. of hydrogen per barrel of feedstock, and recovering hydrotreated products from said reaction zone. The hydrocarbon feed may contain a substantial amount of organic nitrogen, because the catalyst of the present invention is extremely tolerant of organic nitrogen as well as of ammonia, and because the catalyst is an efficient hydrodenitrification catalyst, having high activity and low fouling rate. The catalyst will accomplish hydrodenitrification and hydrocracking concurrently and efficiently. The catalyst may be used as a hydrodenitrification catalyst in a zone preceding a hydrocracking zone containing a similar or different hydrocracking catalyst. A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

The reference to a crystalline zeolitic molecular sieve "substantially free of any catalytic loading metal or metals" means that the molecular sieve contains no more than 0.5 weight percent of catalytic metal or metals, based on the sieve. The catalytic metal or metals include the Group VI and VIII metals.

It will be noted that the weight ratio of catalytic metal in the non-molecular sieve portion of the catalyst to catalytic metal in the molecular sieve portion of the catalyst is high. Certain prior art catalysts achieve a low catalytic metal loading of the molecular sieve component only with a concurrent very low metal content of the non-molecular sieve portion of the catalyst, and it has been found that such catalysts are inferior to the catalyst of the present invention.

Hydrocarbon feedstocks

The feedstocks supplied to the hydrofining-hydrocracking zone in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. Because of the superior hydrofining activity and stability of the catalyst of the present invention, the feedstocks need not be subjected to a prior hydrofining treatment before being used in the hydrofining-hydrocracking process of the present invention. Feedstocks may contain as high as several thousand parts per million organic nitrogen, although preferably the organic nitrogen content will be less than 1000 parts per million organic nitrogen. Feedstocks also may contain several weight percent organic sulfur.

Catalyst comprising a crystalline zeolitic molecular sieve component and preparation thereof (A) General.—The crystalline zeolitic molecular sieve component of the hydrofining-hydrocracking catalyst may be of any type that is known in the art as a useful component of a conventional hydrocracking catalyst containing a crystalline zeolitic molecular sieve component. A decationized molecular sieve cracking component is preferred. Especially suitable are faujasite, particularly Y type and X type faujasite, and mordenite, in the ammonia form or hydrogen form.

(B) Method of preparation.—The molecular sieve component of the catalyst may be prepared by any conventional method known in the art.

The molecular sieve component may be dispersed in a matrix of the other catalyst components by cogelation of said other components around said molecular sieve component in a conventional manner.

The molecular sieve component, substantially in the ammonia or hydrogen form, may be maintained substantially free of any catalytic loading metal or metals, as required by the present invention, by dispersing the molecular sieve component in a slurry of the precursors of the other catalyst components at a pH of 5 or above. When a sodium form of molecular sieve component is one of the starting materials, it may be converted to the ammonia or hydrogen form by ion exchange prior to being combined with the other catalyst components. Alternatively, it may be combined with the other catalyst components and then converted to the ammonia or hydrogen form by ion exchange. In either case, the molecular sieve component should not be combined with the precursors of the other catalyst components at a pH below 5.

When the finished catalyst is to contain more than 50 weight percent of crystalline zeolitic molecular sieve, it will be preferable to include in the catalyst in a known manner a binder material such as a clay-type silica-alumina.

The finished catalyst may be sulfided in a conventional manner prior to use, if desired. If not presulfided, the catalyst will tend to become sulfided during process operation from any sulfur content that may be present in the hydrocarbon feed.

Operating conditions

The hydrocracking zone containing the catalyst of the present invention is operated at hydrocracking conditions including a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

The operating conditions in the reforming zone and catalytic cracking zone employed in various embodiments of the present invention are conventional conditions known in the art.

Process operation with reference to drawing

Referring now to FIG. 1 of the drawing, in accordance with one embodiment of the present invention, a hydrocarbon feedstock as previously described, which in this case may boil above 400° F. and which may contain a substantial amount of organic nitrogen compounds, is passed through line 1 into hydrofining-hydrocracking zone 2, which contains the catalyst of the present invention. The feedstock is hydrocracked in hydrocracking zone 2 at contions previously described, in the presence of hydrogen supplied through line 3. Under these conditions, concurrent hydrodenitrification takes place to the extent that the feedstock is substantially denitrified. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5, the scrubbed, hydrocracked materials are passed through line 9 to distillation column 10, where they are separated into fractions, including a $C_4^-$ fraction which is withdrawn through line 15, a $C_5$-180° F. fraction which is withdrawn through line 16, a 180°–400° F. fraction which is withdrawn through line 17, a 320°–550° F. fraction is withdrawn through line 18, and a 320° F.+ fraction which is withdrawn through line 19. The $C_5$-180° F. fraction withdrawn through line 16 is a superior-quality light gasoline. The 180°–400° F. fraction withdrawn through line 17 is a superior catalytic reforming feedstock, which may be catalytically reformed in reforming zone 20, from which a superior catalytic reformate may be withdrawn through line 25. The 320°–550° F. fraction withdrawn through line 18 is a superior-quality jet fuel. The 320° F.+ fraction withdrawn through line 19 is a superior hydrocracking feedstock, which may be catalytically hydrocracked in hydrocracking zone 26 in the presence of a conventional hydrocracking catalyst and in the presence of hydrogen supplied to zone 26 through line 27. From hydrocracking zone 26, an effluent may be withdrawn through line 28, hydrogen may be separated therefrom in separator 29, and hydrogen may be recycled to hydrocracking zone 26 through line 30. Alternatively, said 320° F.+ fraction may be catalytically cracked in a catalytic cracking zone under conventional catalytic cracking conditions. From separator 29, hydrocracked materials may be passed through lines 35 and 9 to distillation column 10, where they may be separated into fractions, as previously described.

Referring now to FIG. 2, a hydrocarbon feedstock as previously described, which in this case may boil above 400° F. and which may contain substantial amounts of organic nitrogen compounds, is passed through line 50 to hydrofining-hydrocracking zone 51, containing the catalyst of the present invention. The feedstock is concurrently hydrofined and hydrocracked in zone 51 at conditions previously described in the presence of hydrogen supplied through line 52. The effluent from zone 51 may be passed through line 53 into hydrocracking zone 54, where it may be hydrocracked under the same conditions as used in zone 51, in the presence of a hydrocracking catalyst. The hydrocracking catalyst in zone 54 may be the same catalyst as used in zone 51, or may be a conventional hydrocracking catalyst comprising a crystalline zeolitic molecular sieve cracking components, in either of which cases the effluent from zone 51 may be passed through line 53 into zone 54 without intervening impurity removal. If the hydrocracking catalyst in zone 54 does not contain a crystalline zeolitic molecular sieve component, it is preferred that interstage removal of ammonia and other impurities be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains the catalyst of the present invention or a conventional catalyst comprising a crystalline zeolitic molecular sieve component. The effluent from zone 54 is passed through line 56 to separation zone 57, from which hydrogen is recycled through line 58 to hydrofining-hydrocracking zone 51. All or a portion of the recycled hydrogen may be passed through line 59 to hydrocracking zone 54, if desired. In separation zone 57, water entering through line 60 is used to scrub ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a $C_4^-$ fraction which is withdrawn through line 68, a $C_5$-180° F. fraction which is withdrawn through line 69, a 180°–400° F. fraction which is withdrawn through line 70, a 320–550° F. fraction which is withdrawn through line 71, and a 320° F.+ fraction which is withdrawn through line 72. The fraction withdrawn through line 72 may be recycled through lines 73 and 74 to hydrofining-hydrocracking zone 51, and this is a preferred manner of operation. All or a portion of the fraction in line 73 may be recycled to hydrocracking zone 54 through line 75, if desired. The $C_5$-180° F. fraction withdrawn through line 69 is a superior-quality light gasoline. The 180°–400° F. fraction withdrawn through line 70 is a superior catalytic reforming feedstock, which may be catalytically reformed in reforming zone 76, from which a superior catalytic reformate may be withdrawn through line 77. The 320°–550° F. fraction withdrawn through line 71 is a superior-quality jet fuel. All or a portion of the 320° F.+ fraction withdrawn through line 72 may be passed through line 78 to catalytic cracking zone 79, where it may be catalytically cracked under conventional catalytic cracking conditions in the presence of a conventional catalytic cracking catalyst to produce valuable fuel products, which may be withdrawn from zone 79 through line 80.

Examples

The following examples are given for the purpose of further illustrating the catalyst of the present invention, the preparation thereof, and the use thereof in the process of the present invention.

EXAMPLE 1

A cogelled catalyst (Catalyst A, a comparison catalyst) of the following composition is prepared:

| Component: | Wt. percent of total catalyst |
|---|---|
| NiO | 10.5 |
| $MoO_3$ | 37.5 |
| $Al_2O_3$ | 37.5 |
| $SiO_2$ | 14.5 |
| Total | 100.0 |

The catalyst is prepared by the following steps, using sufficient quantities of the various starting materials to produce the above-indicated weight percentages of the components of the final catalyst:

(1) An aqueous acidic solution is prepared, containing $AlCl_3$, $NiCl_2$ and acetic acid.

(2) Three alkaline solutions are prepared: (1) a sodium silicate solution; (2) an ammonium molybdate solution; and (3) an ammonia solution containing sufficient excess ammonia so that upon combining the alkaline solutions with the acidic solution coprecipitation of all of the metal-containing components of the solutions will occur at a neutral pH of about 7.

(3) The acidic and alkaline solutions are combined, and coprecipitation of all of the metal-containing components of the solutions occurs at a pH of about 7, resulting in a slurry.

(4) The slurry is filtered to produce a hydrogel filter cake, which is washed repeatedly with dilute ammonium acetate solution, to remove sodium and chloride ionic impurities from the hydrogel.

(5) The hydrogel is dried in an air-circulating oven and then is activated in flowing air for 5 hours at 950° F.

The finished catalyst is characterized by a surface area of above 200 m.$^2$/g., an average pore diameter of below 100 angstroms, and a bulk density of 0.9+ gram of cata-

EXAMPLE 2

A cogelled catalyst (Catalyst B, a comparison catalyst) of the following composition is prepared:

| Component: | Wt. percent of total catalyst |
|---|---|
| NiO | 9.6 |
| $MoO_3$ | 33.7 |
| $Al_2O_3$ | 33.7 |
| $SiO_2$ | 13.0 |
| Crystalline zeolitic molecular sieve, Y form | 10.0 |
| Total | 100.0 |

The catalyst is prepared exactly as in Example 1, using sufficient quantities of the various starting materials to produce the above-indicated weight percentages of the components of the final catalyst. The catalyst contains the same proportions of non-molecular sieve components as the catalyst of Example 1.

The molecular sieve component, in finely divided form, is added to the slurry referred to in Step 3 of Example 1.

The finished catalyst is characterized by a surface area above 200 m.$^2$/g., an average pore diameter below 100 angstroms, and a bulk density of 0.9 gram of catalyst per cubic centimeter of reactor space occupied by the catalyst.

EXAMPLE 3

A cogelled catalyst (Catalyst C, a comparison catalyst), of the following composition is prepared exactly as in Example 2:

| Component: | Wt. percent of total catalyst |
|---|---|
| NiO | 8.8 |
| $MoO_3$ | 31.5 |
| $Al_2O_3$ | 31.5 |
| $SiO_2$ | 12.2 |
| Crystalline zeolitic molecular sieve, Y form | 16.0 |
| Total | 100.0 |

The finished catalyst contains the same proportions of non-molecular sieve components as the catalyst of Example 1, and is characterized by a surface area above 200 m.$^2$/g., an average pore diameter below 100 angstroms, and a bulk density of 0.77 gram of catalyst per cubic centimeter of reactor space occupied by the catalyst.

EXAMPLES 4–6

Three cogelled catalysts (Catalysts D, E and F, all catalysts according to the present invention) of the following compositions are prepared exactly as in Example 2:

| | Wt. percent of total catalyst | | |
|---|---|---|---|
| | Example 4, catalyst D | Example 5, catalyst E | Example 6, catalyst F |
| Component: | | | |
| NiO | 7.2 | 6.3 | 5.3 |
| $MoO_3$ | 26.3 | 22.5 | 18.7 |
| $Al_2O_3$ | 26.3 | 22.5 | 18.7 |
| $SiO_2$ | 10.2 | 8.7 | 7.3 |
| Crystalline zeolitic molecular sieve, Y form | 30.0 | 40.0 | 50.0 |
| Total | 100.0 | 100.0 | 100.0 |

The finished catalysts contain the same proportions of non-molecular sieve components as the catalysts of Example 1, and are characterized by surface areas above 200 m.$^2$/g., average pore diameters below 100 angstroms, and the following bulk densities in grams of catalyst per cubic centimeter of reactor space occupied by the catalysts:

| Catalyst: | Bulk density, g./cc. |
|---|---|
| D | 0.65 |
| E | 0.57 |
| F | 0.53 |

EXAMPLE 7

Portions of Catalysts B–F of Examples 2–6, respectively, and crushed to 16–28 mesh and are separately used to hydrocrack separate portions of a catalytic cycle oil feedstock derived from a California crude oil, on a once-through basis.

The cycle oil feedstock has the following characteristics:

| | |
|---|---|
| Boiling range, ° F. | 500–820 |
| Gravity, ° API | 17.2 |
| Organic nitrogen content, p.p.m. | 2500 |

The hydrocracking conditions are:

| | |
|---|---|
| Total pressure, p.s.i.g. | 1200 |
| Total hydrogen rate, s.c.f./bbl. | 5000 |
| Liquid hourly space velocity, v./v./hr. | 1.25 |
| Per-pass conversion to products boiling below 500° F., vol. percent | 60 |
| Starting temperature, ° F. | (1) |

$^1$ As indicated below.

The hydrocracking activities of the five catalysts, as measured by the starting temperatures necessary to achieve the indicated per-pass conversion, are:

| Catalyst: | Starting T, ° F. |
|---|---|
| B | 777 |
| C | 769 |
| D | 771 |
| E | 772 |
| F | 770 |

The 300°–550° F. jet fuel boiling range product in each case is of the same adequate quality, in that in each case the smoke point is 15–20 mm. and the freeze point is below −80° F.

The hydrocracked liquid product in each case is essentially free of organic nitrogen compounds, indicating that essentially complete hydrodenitrification accompanies the hydrocracking in each case.

From this example, it appears that: (1) Catalysts D, E and F, all catalysts according to the present invention, have hydrocracking activities comparable to that of Catalyst C, the most active comparison catalyst; (2) Catalysts D, E and F have lower bulk densities than comparison catalysts A, B and C; and (3) therefore, in the case of Catalysts D, E and F, activities comparable to those of the comparison catalysts are obtained with a smaller weight of catalyst.

EXAMPLE 8

Additional portions of Catalysts B–F of Examples 2–6, respectively, are separately used to hydrocrack separate additional portions of the feedstocks used in Example 7, at conditions similar to those of Example 7, except on a recycle basis, with extinction recycle of products boiling above 500° F. The recycle operation results in excellent yields of high quality jet fuel.

EXAMPLE 9

The 500° F.+ product from the once-through operation in Example 7 is further processed in a subsequent hydrocracking or catalytic cracking stage. This product is a superior, upgraded feedstock for such subsequent processing.

EXAMPLES 10–15

Additional portions of Catalysts A–F of Examples 1–6, respectively, are crushed to 16–28 mesh and are separately used to hydrodenitrify separate portions of the same catalytic cycle oil used in Example 7.

The hydrodenitrification conditions are:

| | |
|---|---|
| Total pressure, p.s.i.g. | 1200 |
| Total hydrogen rate, s.c.f./bbl. | 5000 |
| Liquid hourly space velocity, v./v./hr. | 1.25 |
| Product nitrogen, p.p.m. | 1 |

The results are tabulated below, together with the bulk densities of the catalysts:

| Ex. | Catalyst | Catalyst Bulk density, g./cc. | Fouling rate, °F./hr. | Starting T in °F./hr. (hydrodenitrification activity) | Weight ratio 320-500°F. product/ 320°F.- product |
|---|---|---|---|---|---|
| 10 | A | 0.9+ | (¹) | (¹) | (¹) |
| 11 | B | 0.9 | 0.2 | 752 | 2.5 |
| 12 | C | 0.77 | 0.15 | 744 | 3.3 |
| 13 | D | 0.65 | ² 0.06 | ³ 746 | ⁴ 3.8 |
| 14 | E | 0.57 | ² 0.02-0.03 | ³ 747 | ⁴ 3.5 |
| 15 | F | 0.53 | ² 0.04 | ³ 745 | ⁴ 3.5 |

¹ Catalyst would not accomplish hydrodenitrification at the conditions employed.
² Catalysts D, E and F, catalysts according to the present invention, had the lowest fouling rates.
³ Catalysts D, E and F, catalysts according to the present invention, had activities comparable to comparison catalysts B and C, and lower bulk densities; accordingly, activities comparable to those of the comparison catalysts are obtained with a smaller weight of catalyst.
⁴ Use of catalysts D, E and F, catalysts according to the present invention, resulted in the highest weight ratios of 320°-500° F. to 320° F.-products.

Conclusions

Applicant does not intend to be bound by any theory for the unexpectedly superior hydrofining and hydrocracking activity of the catalyst of the present invention. Applicant assumes that the favorable results are largely attributable to, and unique to, the particular combination of catalytic components used, coupled with a low catalyst silica content, low catalyst bulk density, and high catalytic crystalline zeolite molecular sieve content.

What is claimed is:
1. A catalyst composite comprising:
   (A) a gel matrix comprising:
      (a) less than 15 weight percent silica,
      (b) alumina, in an amount providing an alumina-to-silica weight ratio of 50/50 to 100/0,
      (c) nickel or cobalt, or the combination thereof, in the form of metal, oxide, sulfide or any combination thereof, in an amount of 1 to 10 weight percent of said matrix, calculated as metal,
      (d) molybdenum or tungsten, or the combination thereof, in the form of metal oxide, sulfide or any combination thereof, in an amount of 5 to 30 weight percent of said matrix, calculated as metal;
   (B) a crystalline zeolitic molecular sieve:
      (a) substantially in the ammonia or hydrogen form,
      (b) substantially free of any catalytic loading metal or metals,
      (c) in particulate form,
      (d) dispersed through said matrix,
      (e) in an amount of 30 to 70 weight percent of said composite; said catalyst composite being further characterized by an average pore diameter below 100 angstroms and a surface area above 200 square meters per gram.

2. A catalyst as in claim 1, wherein said gel matrix comprises nickel and molybdenum, in the form of the metals, oxides, sulfides or any combination thereof.

3. A catalyst composite as in claim 1, wherein said crystalline zeolitic molecular sieve is present in an amount of 40 to 70 weight percent of said composite.

4. A catalyst composite as in claim 3, wherein said crystalline zeolitic molecular sieve is present in an amount of more than 50 weight percent of said composite.

5. A catalyst composite as in claim 1, characterized by a bulk density in the range 0.35 to 0.7 gram per cubic centimeter.

6. A hydrotreating process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrotreating conditions including a temperature in the range 400° to 900° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrotreated products from said reaction zone.

7. A process as in claim 6, wherein said hydrocarbon feed contains a substantial amount of organic nitrogen, and wherein ammonia is removed from the effluent from said reaction zone.

8. A process as in claim 6, wherein a gasoline product and a jet fuel product are recovered from the effluent from said reaction zone.

9. A process as in claim 8, wherein a portion of the effluent from said reaction zone boiling above the gasoline boiling range is hydrocracked in a second reaction zone in the presence of hydrogen and a hydrocracking catalyst at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and wherein at least one hydrocracked product is recovered from said reaction zone.

References Cited
UNITED STATES PATENTS

| 3,140,253 | 7/1964 | Plank et al. | 208—120 |
|---|---|---|---|
| 3,132,087 | 5/1964 | Kelley et al. | 208—160 |

DELBERT E. GANTZ, Primary Examiner

R. M. BRUSKIN, Assistant Examiner

U.S. Cl. X.R.

208—89, 111, 216; 252—455